United States Patent [19]

Poss

[11] 4,340,184

[45] Jul. 20, 1982

[54] APPARATUS FOR MECHANICAL SEPARATION OF A COMBINATION OF MEAT AND BONE INTO USEFUL FRACTIONS

[75] Inventor: Werner Poss, Oakville, Canada

[73] Assignee: Poss Design Limited, Hamilton, Canada

[21] Appl. No.: 99,350

[22] Filed: Dec. 3, 1979

[51] Int. Cl.³ .................... A22C 17/00; B02C 23/16
[52] U.S. Cl. ................................................ 241/82.3
[58] Field of Search .................. 17/1 G, 46; 241/24, 241/74, 82.1, 82.3, 260.1; 426/479, 480; 366/323; 100/117, 147

[56] References Cited

U.S. PATENT DOCUMENTS

| | | | |
|---|---|---|---|
| 529,149 | 11/1894 | Woodruff | 241/82.3 |
| 3,384,138 | 5/1968 | Johnson et al. | 241/247 |
| 3,432,344 | 3/1969 | Farmer | 100/147 X |
| 3,739,994 | 6/1973 | McFarland | 241/74 |
| 3,943,034 | 3/1976 | Wallen | 100/147 X |
| 4,024,168 | 5/1977 | Homann et al. | 100/117 |
| 4,025,001 | 5/1977 | Yarem et al. | 241/74 X |
| 4,042,176 | 8/1977 | Beck et al. | 241/74 X |
| 4,077,089 | 3/1978 | Dutaud | 17/1 G |
| 4,189,104 | 2/1980 | Santos | 241/82.3 |

FOREIGN PATENT DOCUMENTS 606120 11/1934 Fed. Rep. of Germany ..... 241/82.3

Primary Examiner—Willie G. Abercrombie
Attorney, Agent, or Firm—Hirons, Rogers & Scott

[57] ABSTRACT

The invention provides processes and apparatus for the mechanical separation of a combination of meat and bone into useful fractions, the combination being conveyed by a screw of new cross-section profile through a screen, which comprises a portion of an elongated cylindrical conduit, softer components, i.e. the meat, being expressed through the screen, while harder components, i.e. the bone, are contained by the screen and fed out of the conduit. The screen is constituted by alternate flat and configured annular discs, the latter providing the necessary large plurality of small apertures through which the softer components can be expressed. The screw is designed to develop a radially-outward pulsing action of the combination against the interior wall of the screen to produce the desired separation at a lower pressure than with prior art apparatus and minimization of shear of the combination against the screen interior wall. The apparatus is provided with a spring controlled throat that permits automatic control of the pressure applied to the separating combination of meat and bone, and that also permits adjustment of that pressure to suit the type of meat in the combination that is being separated.

8 Claims, 6 Drawing Figures

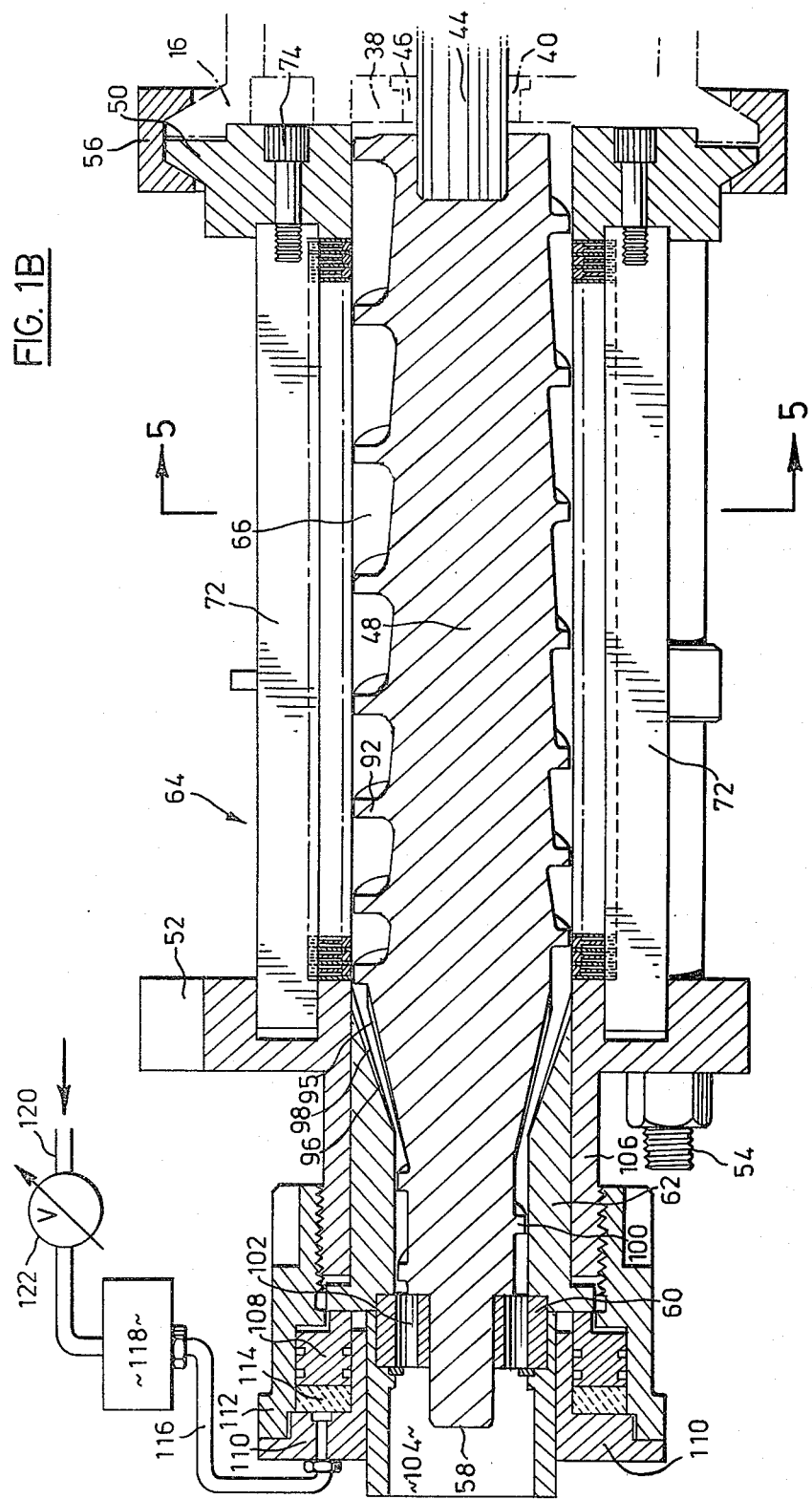

APPARATUS FOR MECHANICAL SEPARATION OF A COMBINATION OF MEAT AND BONE INTO USEFUL FRACTIONS

FIELD OF THE INVENTION

This invention relates to processes and apparatus for mechanical separation of a combination of meat and bone into useful fractions.

REVIEW OF THE PRIOR ART

Prior examples of such apparatus are found for example in U.S. Pat. No. 3,739,994; U.S. Pat. No. 3,741,772; U.S. Pat. No. 3,906,118; U.S. Pat. No. 3,398,676; U.S. Pat. No. 3,398,677; U.S. Pat. No. 1,785,041; U.S. Pat. No. 1,930,189; U.S. Pat. No. 1,772,262; French Pat. No. 46,408 (First Addition to No. 764,386; and U.S. Pat. Nos. 4,025,001 and 4,069,980.

SUMMARY OF THE INVENTION

I am a co-inventor of the last-mentioned two patents. It is the object of all of the processes and apparatus disclosed in these patents to separate a random combination of meat and bone into useful fractions. In practice it is impossible to effect a complete separation and it is a constant endeavour to provide one fraction that is as high as possible in meat content and as low as possible in bone content, while the other fraction is as high as possible in bone content and as low as possible in meat content. Many authorities now place a strict upper limit on the bone content of meat derived from a process of mechanical separation.

It is found that one of the principal sources of bone content in the meat fraction is bone dust that has been produced by shearing action as the combination is moved by the feed screw across the face of the screen, and at the same time is forced under high pressure against the screen to express the meat through its apertures. In some prior art apparatus this pressure may be as high as 85 kg.s.cm. (1200 p.s.i.), which is high enough to shear off pieces of bone small enough to pass through the screen apertures as the bone is moved over the screen surface. It is therefore a constant endeavour to reduce this pressure and also to provide that the bones are broken cleanly without any shearing thereof.

DEFINITION OF THE INVENTION

It is therefore the object of the invention to provide a new process and new apparatus for mechanical separation of meat and bone into useful fractions.

It is a more specific object to provide such processes and apparatus in which the pressure to which the combination is subjected can be reduced with consequent reduction in the above-described shearing action on the bone content against the separator screen.

In accordance with the present invention there is provided apparatus for the mechanical separation of meat and bone into separate fractions thereof comprising:

(a) a cylindrical conduit having an inlet end and an outlet end and containing a feed screw rotatable about a longitudinal axis, (b) the feed screw comprising a plurality of successive lands and upon rotation about its axis moving a meat and bone combination to be separated along the conduit from the inlet to the outlet end and applying radially outwardly operative pressure to the combination pressing it against the conduit wall, (c) at least part of the conduit wall comprising a separator screen whereby the pressure of the combination against the screen part forces the meat fraction through the screen while the bone fraction is retained thereby and moved through the conduit to the outlet end, (d) of circular transverse cross-section with the centre of the cross-section displaced from the longitudinal axis about which the screw rotates, the said cross-section centre describing a helical path about the said longitudinal axis along the length of the screw, the said feed screw being so that the said rotation of the screw applies a radially outwardly pulsating pressure force to the combination.

DESCRIPTION OF THE DRAWINGS

Processes and apparatus for the mechanical separation of meat and bone into useful fractions which are particular preferred embodiments of the invention will now be described, by way of example, with reference to the accompanying diagrammatic drawings wherein:

FIGS. 1A and 1B together are a longitudinal cross-section of the apparatus,

DETAILED DESCRIPTION OF THE PREFERRED EMBODIMENTS

Figure 1A:
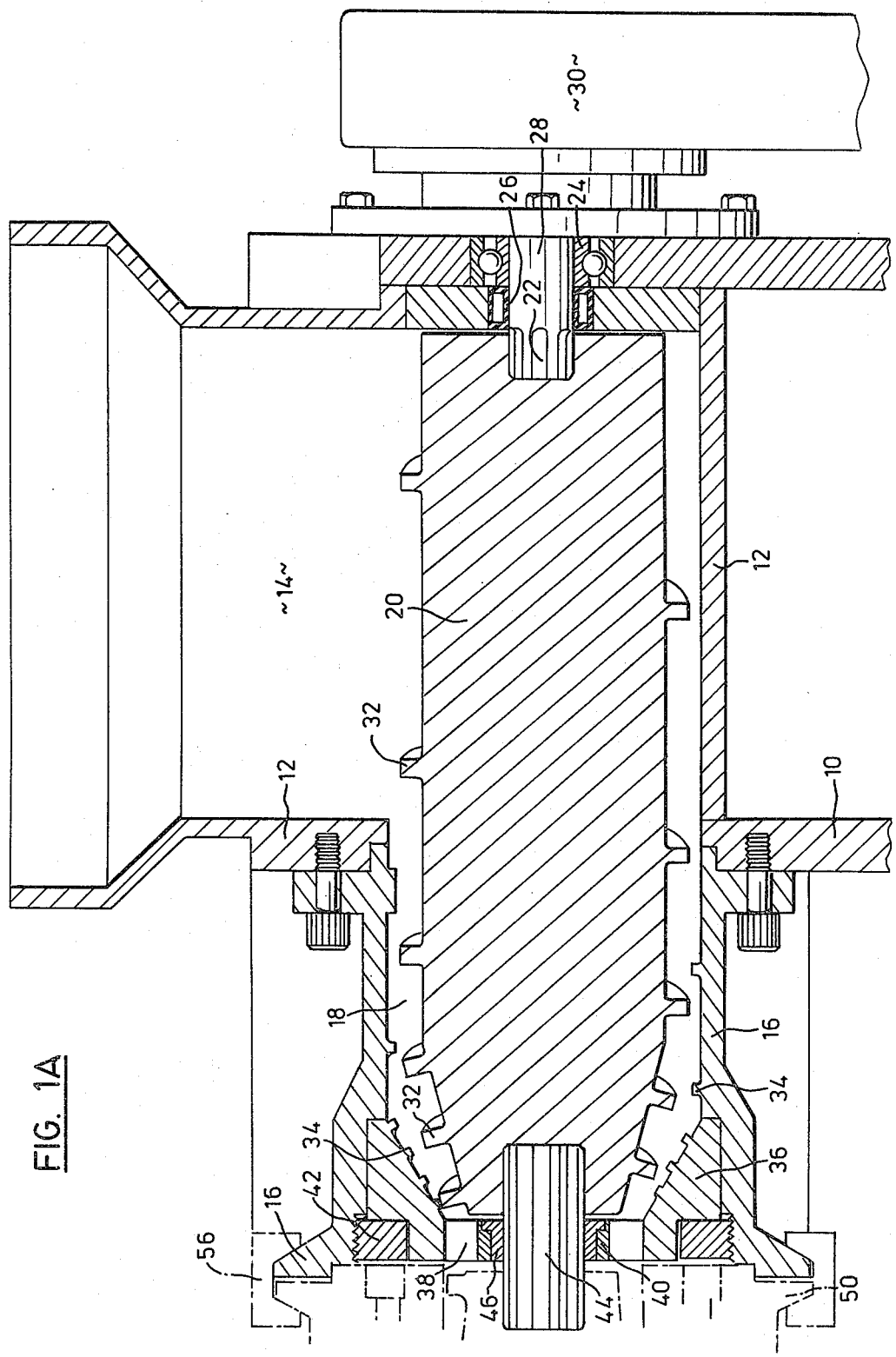
Figure 4:
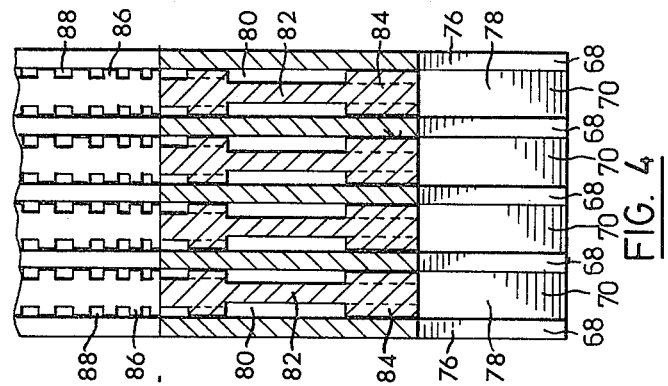
FIG. 4 is a partial section of a portion of a stack of plates as would be seen taken along lines 4—4 of FIGS. 2 and 3.

The part of the apparatus illustrated in FIG. 1A is a feed and pressurising section, and will be described first, while the part illustrated in FIG. 1B is the separating section, and will be described thereafter.

The part of the apparatus of FIG. 1A comprises a base indicated generally by the reference 10 in which a drive motor (not shown) is mounted. On the top of the base is mounted a casing 12 providing a hopper 14 for the reception of the meat and bone combination to be separated. The casing 12 has fastened thereto a tubular casing 16 providing a passage 18 and having mounted therein a conveyor screw 20, the screw being rotatable about a horizontal longitudinal axis. The rear end of the screw 20 has a splined recess and is in rotational driving engagement with a splined boss 22 mounted in the casing by a bearing 24; a seal 26 is also provided. This boss is constituted by the free end of output shaft 28 of a speed reduction gear 30, the input to the speed reduction gear being via a suitable drive from the above-mentioned drive motor.

The body of the conveyor screw 20 adjacent the hopper 14 and into the passage 18 is of uniform diameter and then decreases progressively in diameter, this decrease starting inside the passage 18 and continuing to the end of the screw. The body is provided with a thread 32 which decreases progressively in pitch to apply a corresponding progressively increasing pressure to the entrained combination. The cylindrical internal wall of part 16 is provided with another stationary screw thread 34 of opposite hand to the screw thread 32, and this thread 34 continues with progressively decreasing pitch and diameter on the inner cylindrical tapered wall of a corresponding part 36. The threads 32 and 34 form between themselves a throat of progressively reducing diameter in which the bones in the combination are broken relatively cleanly before they are forced by the conveyor screw through openings 38 in a spider 40, and into the separating section. It will be noted that at the outlet from this throat the two threads 32 and 34 are almost touching so that the bones are broken into relatively small pieces.

I have found that a bone breaking arrangement of the kind employed in the apparatus of this invention results in much lower bone contents in the meat fraction than is obtainable in prior art apparatus in which the bones are broken by the shearing action of a knife blade rotating against an apertured plate through which the combination passes. This less satisfactory result of such prior art apparatus is believed due to the fundamental construction of animal bone. Thus, bone is of relatively porous structure and the action of the shearing knife blade on such material while it is jammed against the usual apertured breaker plate is to crumble it and form relatively large amounts of bone dust that can pass easily through the separator screen with the meat fraction. The bone breaking apparatus of this invention breaks the bones cleanly with a considerable reduction in the production of such dust.

The part 36 is held in place in a counterbore in the body part 16 by an annular nut 42 screw-threaded around its outer periphery. Upon removal of the nut 42 the part 16 and the conveyor screw 20 can be removed for the disassembly and cleaning that is an essential and continuing item in the servicing of any apparatus employed for the processing of food. The other parts of the machine that are contacted by the combination are also arranged for such convenient disassembly for this purpose.

Referring now principally to FIG. 1B, the end of the conveyor screw 20 at the outlet of the bone breaking throat is provided with a splined recess receiving a splined connecting shaft 44 that passes through a plain thrust bearing 46 in the spider 38. The splined connector 42 is engaged in the adjacent end of a feed screw 48 mounted for rotation about a longitudinal axis coaxial with that of the conveyor screw 20. The separator portion of the apparatus body mounting the feed screw consists of two longitudinally spaced end plates 50 and 52 connected together by three circumferentially spaced tie rods 54, the end plate 50 being clamped to the casing 16 by an annular clamp ring 56. The other end 60 of the feed screw is supported by a plain bearing 60 having the form of an axially-apertured spider, the bearing being mounted in an axially-movable annular part 62 which is in turn mounted by a tubular extension of the end plate 52 for such movement, as will be described below.

Figure 3:
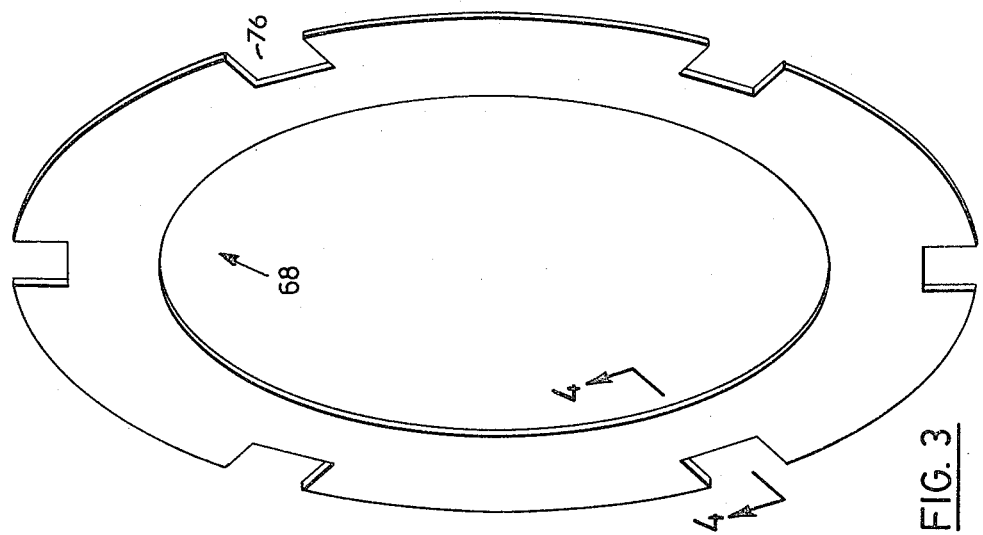
FIG. 3 is a similar view of one form of plain annular plate as used in the apparatus of FIGS. 1A and 1B.
Figure 2:
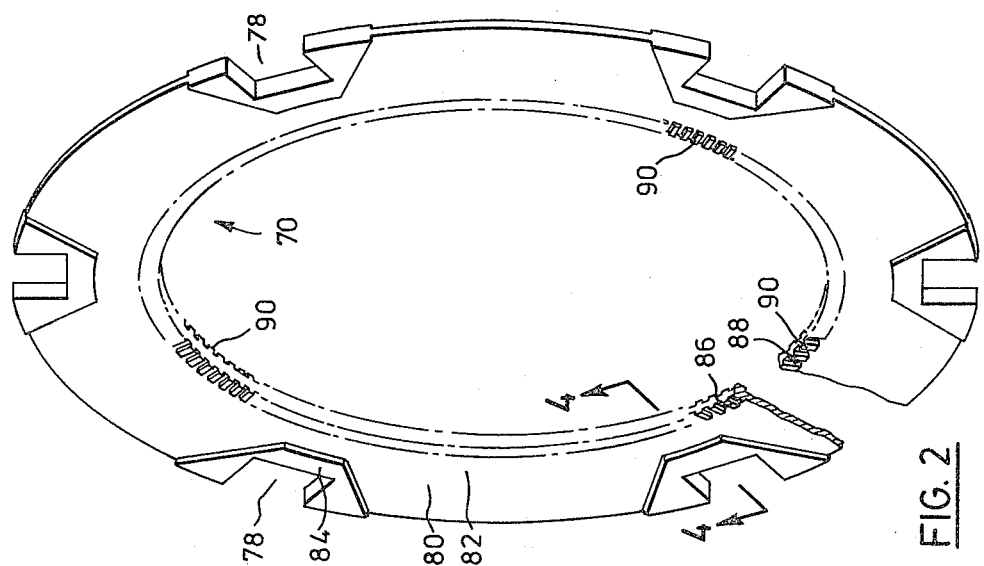
FIG. 2 is a perspective view of a configured annular plate used in the apparatus of FIGS. 1A and 1B, one part being broken away to show the cross-section.

A separator screen, indicated generally by reference 64, forms a cylindrical conduit providing an annular bore 66, the screen surrounding the feed screw member to separate into different fractions the pressurized combination of meat and bone fed thereto by the screw 20 through the spider apertures 38. The screen is constituted by a stack of a large number of plain annular discs 68 (FIG. 3), alternating with configured annular discs 70 (FIG. 2), which are clamped tightly face-to-face by the tie rods 54, and are held in circumferential alignment with one another by a set of six equally-circumferentially-spaced rectangular cross-section longitudinal bars 72 extending between the end plates 50 and 52 and connected to the plate 50 by bolts 74. The plain discs 68 are of uniform thickness and provided with six equally-circumferentially-spaced rectangular slots 76 to receive the bars 72. The configured discs 70 are also provided with rectangular slots 78 to receive the bars, but they are cut away to provide recesses in each annular face at 80, leaving a central web 82 of reduced thickness, spacer portions 84 surrounding each slot 78 and slotted annular radially-inner ring 86. Slots such as 88 in the ring 86 are in this embodiment inclined at an angle of about 150° to the respective radius, the inclination being opposite to the direction of rotation of the feed screw 28. In other embodiments this angle may vary from about 165° to about 120°. It will be seen that each sandwich of two plain discs 68 with an interposed configured disc 70 provides two circumferential rows each of a large number of small rectangular cross-section bores 88 constituted by the slots, these bores discharging radially and circumferentially from the separator space 66, each row feeding into a respective radially-outer narrow single circumferential slot formed by the recessed portion 80 of the disc. The metal part that remains between each immediately adjacent pair of slots/bores is of parallelopiped shape and because of the inclination of the slots/bores in the direction opposite to that of the rotation of the feed-screw each of these metal parts presents an obtuse-angled blunt edge such as 90 to the meat/bone combination in the space 66. Such a blunt edge avoids removal from the bone of slivers that are able to pass through the bores 88 to increase the bone content of the meat fraction, as is likely to happen if this angle is acute or even a right angle.

Figure 5:
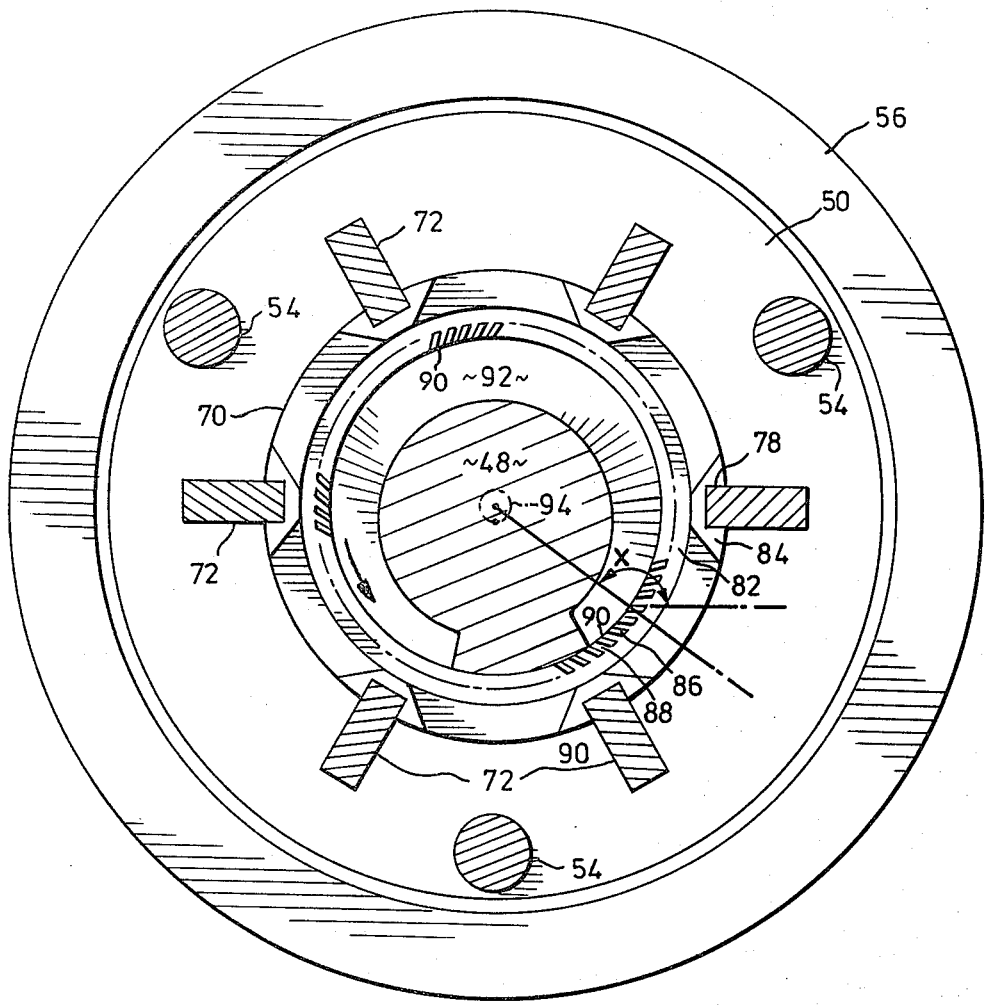
FIG. 5 is a cross-section taken on the line 5—5 of FIG. 1B.

The design of the screw thread 92 of the feed screw is such that the rotation of the screw produces a radially-outwardly-acting pressure force on the combination in the cylindrical conduit provided by the screen 64. This conduit is of uniform internal diameter and the screw lands are of substantially uniform external radius centered on the longitudinal axis of the conduit so that they terminate close to the screen interior surface with a narrow gap of uniform height between them, but it will be observed from FIG. 1B that, in the direction of flow of the meat/bone combination therein from the inlet of the conduit to its outlet, the body of the screw between each immediately succeeding pair of flight lands increases progressively in radius from a minimum value at the forward root of the real land of the two to a maximum value at the rear root of the next forward land, the screw body profile between the roots being a straight line and, in particular, is not concave. A profile with any substantial amount of concavity would permit a circulation of the meat/bone combination in the spaces between the successive parts of lands that would interfere with the desired action of the screw. FIG. 5 also illustrates the screw profile provided in this embodiment to obtain the pulsating force. Thus, the transverse cross-section of the screw body is circular and it remains circular throughout its length, while the centre of the circular cross-section describes a circular orbit about the longitudinal axis, as indicated by the broken line bearing the reference 94, this circle being described over the distance between each immediately successive pair of lands.

The path of the circle cross-section is therefore a helix of uniform radius but changing pitch. A circular cross-section and a circular orbit are employed to simplify as much as possible the production of what is already a complex profile to form. The required compensation for the loss of meat fraction through the screen is produced by progressive decrease of the pitch of the screw thread, the decrease being that calculated to provide as much as is possible a substantially constant pressure in the separating material.

As the meat/bone combination is moved axially along the space 66 by the action of the thread 92 it is therefore subjected to the said radially-outwardly-acting pulsating pressure force, and such a force is found to be much more effective than a constant pressure in forcing the meat fraction through the bores 88, so that lower pressures can be employed. The friction of the separating combination against the screen is higher than that between the screw and the combination, while the shear rate in the meat fraction is higher than in the bone fraction, so that the radial pulsating force is able to act on the combination while in contact with the screen surface. Thus, it is found that the screw operates highly effectively with internal pressures as low as 7 kg.s.cm. (100 p.s.i), the pressures employed being within the range 7–32 kg.s.cm (100–450 p.s.i.), instead of the values of 70–85 kg.s.cm (1000–1200 p.s.i.) employed previously, resulting in much less internal heating and deterioration of the meat product than has been encountered with such prior art apparatus.

An important structural feature in obtaining satisfactory operation at such low pressures is the comparatively small radial depth of the bores 88, permitting ready flow of the separating meat fraction therethrough without the generation of high back pressure in the combination. This desirable effect is also facilitated by the illustrated structure in which the bores 88 discharge quickly into the much larger circumferential slot 80 surrounding them, the deep web 82 bounding the slots giving the rings the necessary rigidity under the high radial pressures to which they are subjected. The described construction therefore provides a separator screen of the necessary strength for satisfactory continuous operation without distortion, while permitting its ready disassembly for cleaning.

At the end of the separator space 66 the body of the feed screw 48 decreases progressively and rapidly in diameter and is provided with a high pitch shallow thread 95, while the cooperating tapered face 96 of the tubular member 62 is provided with a high pitch shallow thread 98 of opposite hand to apply back pressure to the exiting bone fraction. The bone fraction that emerges from the tapered throat formed between the two threads 95 and 98 is moved by thread 100 on the small diameter feed screw end portion out through exit ports 102 in the spider member 60 to apparatus outlet 104.

For optimum performance of the apparatus it is desirable to maintain the meat/bone combination in the space 66 automatically under a constant average pressure. It is also desirable to be able to adjust the average value of this pressure in accordance with the type of meat that is being processed and, for example, a higher average pressure is required for red meats such as beef and pork, as compared with that needed for "white" meats such as chicken and fish. In the absence of such adjustment it is generally only possible for an apparatus to operate successfully with only one type of meat, severely limiting its usefulness.

To this end the tubular part 62 is mounted for axial sliding movement in a cylindrical portion 106 extending from the end plate 52, the part 62 abutting against an annular piston 108 mounted in a cylinder formed between two parts 110 and 112. The part 110 is mounted for axial sliding and rotating movement on the end of the part 62, while the part 112 surrounds the adjacent end of the cylindrical portion 106, and is in screw-threaded engagement therewith, so that axial rotation of parts 110 and 112 also moves them axially to change the volume of cylinder chamber 114. The chamber 114 is filled with a hydraulic oil supplied via a pipe 116 from an air/hydraulic multiplier 118 that is in turn supplied with compressed air via a pipeline 102 through controllable pressure reducing valve 122. This structure constitutes a controllable hydraulic spring means urging the member 62 to the right as seen in FIG. 1B so as to close the throat gap between the threads 94 and 98 and maintain the average pressure applied to the separating meat/bone combination at a value corresponding to the applied spring pressure. Thus, if the pressure applied to the combination drops below this desired value the piston 108 is also to move the member 62 further to the right, closing the throat and thereby holding back the exiting separated bone fraction until the pressure has increased again. Conversely, if the pressure in the space 66 increases above the desired value the part 62 will move to open the throat gap, so that the bone fraction can flow more quickly and pressure decreases back to the predetermined value. A change between different meats to be processed simply requires therefore an adjustment of the axial position of the part 112 by rotation thereof and/or an adjustment of the valve 122 until the desired conditions are obtained. It will be apparent that the hydraulic spring could be replaced by a mechanical compression spring system of the required rate and compressive strength, but in commercial practice a hydraulic system is easier to adjust over the range of forces and movements required.

In this particular preferred embodiment, and by way of example only, the apparatus illustrated in a size to process 3,000 kg of product per hour will have a screen 64 of 30 cm length. Each disc is of 22.4 cm external diameter and 15.24 internal diameter, the radial length of slots/bores 88 being about 3 mm, the preferred limits of this dimension being about 3–7 mm. The thickness of each plain disc 68 is 1.5 mm and is not of course particularly critical, while the thickness of each configured disc 70 is 5 mm and can vary between about 3 and 6.5 mm. In this embodiment each disc 70 is recessed at 80 to a depth of 1 mm on each side, and consequently the larger circumferential slot is of this width; this dimension will usually change with the thickness of the configured disc and will usually be in the range 1–2 mm for the specified range of ring thicknesses. The slots/bores 88 are much narrower and will usually measure about 0.3 mm to 0.4 mm in corresponding dimension so that there is an immediate pressure drop as the separated meat exits from the slots/bores 88 into the wider circumferential slot 80. Their circumferential width can be the same, but usually will be larger, of the order of 0.5 mm to 1.5 mm.

I claim:
1. Apparatus for the mechanical separation of meat and bone into separate fractions thereof comprising:
   (a) a cylindrical conduit having an inlet end and an outlet end and containing a feed screw rotatable about a longitudinal axis,
   (b) the feed screw comprising a plurality of successive lands and upon rotation about its axis moving a meat and bone combination to be separated along the conduit from the inlet to the outlet end and applying radially outwardly operative pressure to the combination pressing it against the conduit wall, (c) at least part of the conduit wall comprising a separator screen whereby the pressure of the combination against the screen part forces the meat fraction through the screen while the bone fraction is retained thereby and moved through the conduit to the outlet end, (d) the said feed screw being of circular transverse cross-section with the centre of the cross-section displaced from the longitudinal axis about which the screw rotates, the said cross-section centre describing a helical path about the said longitudinal axis along the length of the screw so that the said rotation of the screw applies a radially outwardly pulsating pressure force to the combination.

2. Apparatus as claimed in claim 1, wherein the said cross-section describes a complete circle about the said longitudinal axis in the distance along the length of the screw between each immediately successive two screw lands.

3. Apparatus as claimed in claim 1, wherein the separator screen is constituted by a plurality of radially-extending bores inclined at an angle of between 165° and 120° to a radius opposite to the direction of rotation of the feed screw, so that the portion of the separator screen having the said bores are configured to provide obtuse angled blunt edges to the combination presented thereto by the feed screw.

4. Apparatus as claimed in claim 1, wherein the separator screen is constituted by a stack of a plurality of plain annular rings and a plurality of configured annular rings disposed face to face, the plain and configured rings alternating in the stack, both pluralities being of the same internal and external diameter, the configured rings being recessed at each annular face opposite to the immediate adjacent plain ring to provide a plurality of radially-extending bores at the radially inner edge leading to a substantially continuous circumferential slot at the radially outer edge and into which the said bores discharge.

5. Apparatus as claimed in claim 1, and including a hopper into which the meat and bone combination is deposited, and a conveyor screw in the hopper for feeding the combination to the said cylindrical conduit inlet, wherein the said conveyor screw comprises a progressively reducing radius portion at its end nearer to the said conduit inlet in a corresponding annular throat formed between the said progressively reducing radius portion of the conveyor screw and a cylindrical passage wall of progressively reducing diameter in the direction of movement of the combination and feeding into the said conduit inlet, the said cylindrical passage wall carrying a screw thread of opposite hand to the conveyor screw thread and cooperating therewith to break bones passing through the annular throat.

6. Apparatus for the mechanical separation of meat and bone into separate fractions thereof comprising:
(a) a cylindrical conduit having an inlet end and an outlet end and containing a feed screw rotatable about a longitudinal axis,
(b) the feed screw comprising a plurality of successive lands and upon rotation about its axis moving a meat and bone combination to be separated along the conduit from the inlet to the outlet end and applying radially outwardly operative pressure to the combination pressing it against the conduit wall,
(c) at least part of the conduit wall comprising a separator screen whereby the pressure of the combination against the screen part forces the meat fraction through the screen while the bone fraction is retained thereby and moved through the conduit to the outlet end,
(d) a hopper into which the meat and bone combination is deposited, and a conveyor screw in the hopper for feeding the combination to the said cylindrical conduit inlet,
(e) wherein the said conveyor screw comprises a progressively reducing radius portion at its end nearer to the said conduit inlet in a corresponding annular throat formed between the said progressively reducing radius portion of the conveyor screw and a cylindrical passage wall of progressively reducing diameter in the direction of movement of the combination and feeding into the said conduit inlet, and
(f) the said cylindrical passage wall carrying a screw thread of opposite hand to the conveyor screw thread and cooperating therewith to break bones passing through the annular throat.

7. Apparatus for the mechanical separation of meat and bone into separate fractions thereof comprising:
(a) a cylindrical conduit having an inlet end and an outlet end and containing a feed screw rotatable about a longitudinal axis,
(b) the feed screw comprising a plurality of successive lands and upon rotation about its axis moving a meat and bone combination to be separated along the conduit from the inlet to the outlet end and applying radially outwardly operative pressure to the combination pressing it against the conduit wall,
(c) at least part of the conduit wall comprising a separator screen whereby the pressure of the combination against the screen part forces the meat fraction through the screen while the bone fraction is retained thereby and moved through the conduit to the outlet end, and
(d) the separator screen being constituted by a plurality of radially-extending bores inclined at an angle of between 165° and 120° to a radius opposite to the direction of rotation of the feed screw, so that the part of the separator screen having the said bores is configured to provide obtuse angled blunt edges to the combination presented thereto by the feed screw.

8. Apparatus as claimed in claim 7, wherein the separator screen is constituted by a stack of a plurality of plain annular rings and a plurality of configured annular rings disposed face to face, the plain and configured rings alternating in the stack, both pluralities being of the same internal and external diameter, the configured rings being recessed at each annular face opposite to the immediate adjacent plain ring to provide a plurality of radially-extending bores at the radially inner edge leading to a substantially continuous circumferential slot at the radially outer edge and into which the said bores discharge.

* * * * *